Patented July 14, 1942

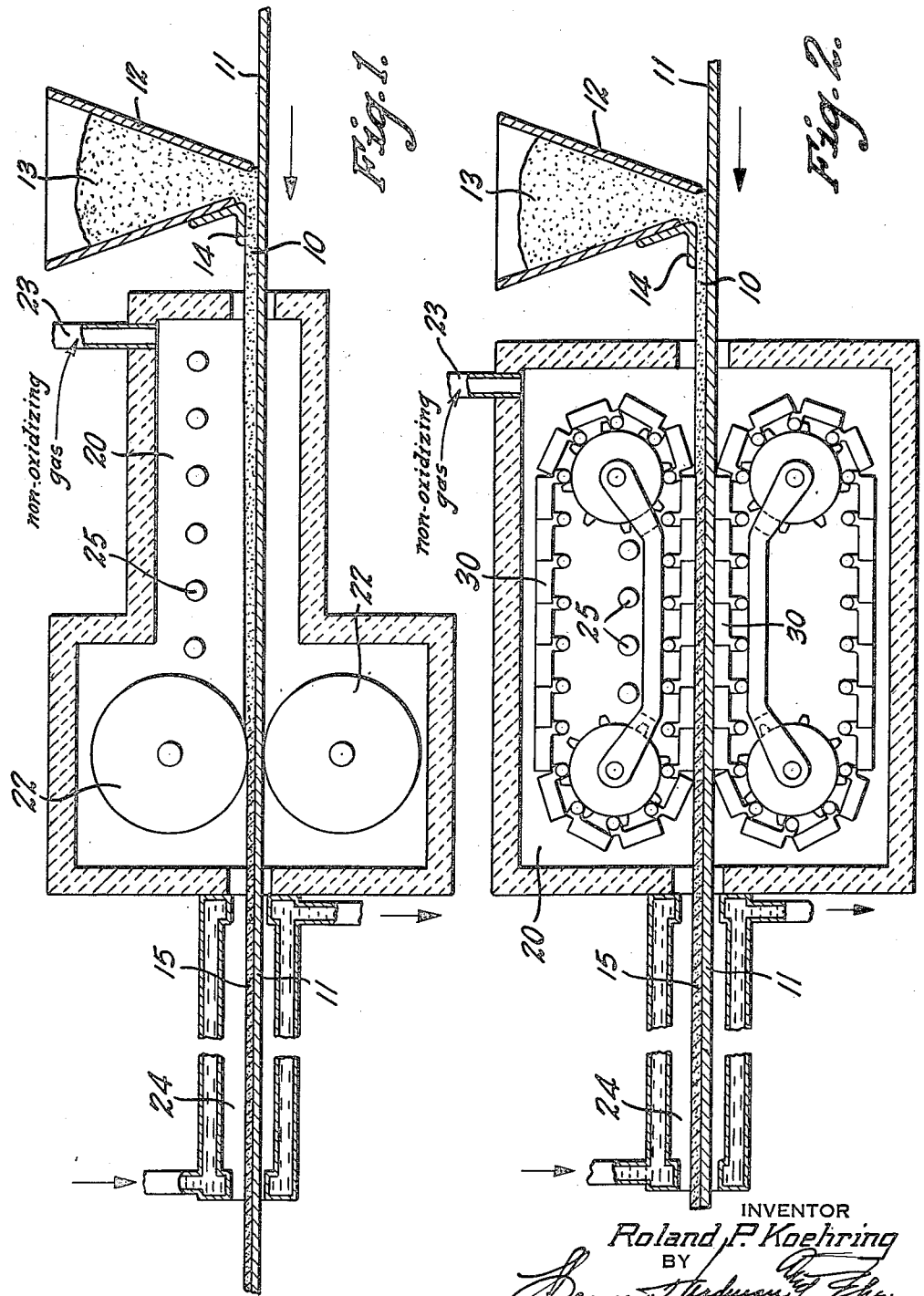

2,289,658

UNITED STATES PATENT OFFICE 2,289,658

METHOD OF MAKING COMPOSITE METAL ELEMENTS

Roland P. Koehring, Dayton, Ohio, assignor to General Motors Corporation, Detroit, Mich., a corporation of Delaware Application May 1, 1939, Serial No. 271,046

11 Claims. (Cl. 29—189)

This application is a continuation in part of my copending application, Serial No. 85,297, filed June 15, 1936.

This invention relates to a method of making composite metal parts having a relatively strong dense metal back strongly bonded to a porous metal lining of long wear characteristics. This method may be used in making anti-friction bearings or the like, or in the manufacture of high-friction elements, such as clutch disks, or brake shoes and the like.

Hence, a general object of this invention is to provide an improved method of making a composite metal part having a reinforcing metal back strongly bonded to a lining made of different material which has long-wear characteristics when used as a rubbing element. The desired characteristics of the lining are obtained by choosing the proper composition thereof. For instance, if an anti-friction bearing element is desired certain ingredients are used to make a lining of low-friction characteristics; if a high-friction element is desired certain other ingredients are used to make the lining having a relatively high coefficient of friction.

A more specific object of the invention is to provide a method of making a composite element consisting of a porous metal lining bonded to a metal back by sintering uncompacted metal powder laid loosely upon the back wherein the loose layer of metal powder is compacted during the sintering step, by means of rolls or other expedients, within the sintering chamber. A feature of this method is the non-briquetting of metal powder prior to sintering the powder together and bonding the same to the metal back. When the metal powder, which is to be sintered together to form the porous lining, is merely laid loosely upon the metal back in a non-compacted condition it is more easily bonded to the metal back since it conforms quite readily to slight warpage of the back which occurs during heating. By the use of pressure rolls located at any desired position within the furnace the degree of porosity of the porous metal may easily be controlled simultaneously with the sintering thereof. In copending application, Serial No. 81,432, filed May 23, 1936, now matured in Patent No. 2,158,461 and assigned to the assignee of the present application, the metal powder used to form the lining is first highly compacted upon the metal back prior to the sintering. It is apparent that this initial compacting of the powder requires higher pressures than will be necessary when compacting powder in the heated condition as herein described. Thus the present invention makes such manufacture more facile and also reduces the cost of manufacture.

Further objects and advantages of the present invention will be apparent from the following description, reference being had to the accompanying drawing wherein a preferred embodiment of the present invention is clearly shown.

In the drawing:

Figure 1 is a diagrammatic view illustrating one method of applying loose non-compacted powder to a metal back and then compacting the powder metal simultaneously with the sintering thereof; and Figure 2 shows another embodiment of the apparatus diagrammatically illustrated in Figure 1.

Referring to Figure 1, a loose layer 10 of the desired thickness of finely divided metal powder is applied on to a relatively strong metal strip 11, such as steel, as the strip 11 moves along under the hopper 12 at a slow uniform speed. The loose metal powder 13, in hopper 12, runs out by gravity upon the strip 11 and is smoothed out by a suitable adjustable smoothing device 14 to provide a smooth uniform layer 10 of the loose metal powder.

The moving strip 11 with the loose layer 10 thereon next passes through the sintering chamber 20 and is there heated in a non-oxidizing atmosphere to a temperature and for such a time period as will cause the metal particles to partially fuse or alloy together and to molecularly bond together and form a porous lining 15 and at the same time to molecularly bond to the metal strip 11. The porous metal layer 10 may be subjected to a compacting step within the sintering chamber wherein the metal powder 10 is compacted during the sintering thereof, that is while the metal powder is in the heated condition and in this manner the metal powder layer is reduced in thickness and the porosity is likewise reduced during this compacting step as well as increasing the strength of the sintered material. A preferred expedient to accomplish the compacting is to mount a pair of pressure rolls 22 within the sintering chamber, said rolls being adjustable so that any desired degree of compacting may be accomplished. If the strip 11 is of steel, it is preferable, but not necessary, to first copper plate the steel before the loose powder layer 10 is applied thereon, since it has been found that the sintered porous lining 15 will bond more readily to a copper surface than it will be to a steel surface. However, lining 15 will bond successfully to an uncoated steel surface which is clean.

The porous metal lining 15 bonded to the steel back 11 passes from the hot sintering chamber 20 into a water jacketed cooling chamber 24 where it is cooled in a dry non-oxidizing atmosphere to prevent rapid oxidation of porous metal when exposed to room atmosphere when still very hot. The non-oxidizing atmosphere is supplied constantly to the sintering chamber 20 through a duct 23 and passes outwardly through the cooling chamber 24 and through the entrance into the sintering chamber 20 thereby preventing ingress of the room atmosphere. A suitable non-oxidizing atmosphere may be made by incompletely burning natural gas and then removing water vapor therefrom until there remains only a very small amount of water vapor in the gas. The sintering chamber 20 may be heated by means of the electric heating elements 25 or by any other suitable heating means.

If desired, the density or porosity of the porous lining 15 may be controlled by mounting the pressure rolls 22 within the cooling chamber 24 whereby the lining 15 is compacted while still hot to the desired porosity. I prefer, however, to carry out the compacting simultaneously with the sintering since lower pressures are required to accomplish the same result, such pressure being inversely proportional to the temperature of the lining or layer 15.

A number of varying powdered mixtures may be satisfactorily bonded together and simultaneously bonded to the steel by the present method, reference being made to my copending application, Serial No. 85,297, now matured into Patent No. 2,198,253, of which this application is a continuation in part, wherein a number of such metals and metal mixtures is given. In the case of frictional material the initial ingredients can also include such well known abrasives as asbestos, alundum, silica as well as graphite and lead which prevent galling, etc.

The following is given as a specific example of bonding and simultaneously sintering metal powder to a steel strip. In this instance, the metal powder 13 is a mixture of 90% copper and 10% tin powder. This mixture is uniformly distributed upon the surface of the steel 11 and is passed into the sintering chamber 20 wherein the temperature is maintained between 1500 and 1600° F. by suitable means, for example, electrical elements 25. The powder is heated and begins to sinter as the strip 11 moves through the chamber 20 and is compacted by rolls 22 during the sintering operation. Any desired degree of pressure may be applied by roll 22 so as to yield a porous lining 15 of the desired porosity, for example from 100 pounds per square inch to 5,000 pounds per square inch. The sintering period may vary from ten minutes to a half hour without affecting the uniformity of the porous layer 15. After the strip 11 with the porous layer 15 thereon has been cooled in chamber 24, it will be noted that the porous metal lining 15 provides a homogeneous porous bronze layer strongly bonded to the steel 11. It is apparent that while a continuous method of applying metal powder to a steel back is illustrated that a similar procedure could be carried out on single pieces wherein the powder is distributed upon a metal supporting member and is placed within the sintering chamber and compacted during heating.

Figure 2 shows another embodiment of my invention wherein a caterpillar type of compacting device is utilized, as shown at 30. The device 30 is provided so that the metal powder may be under compression substantially throughout the sintering period as differentiated from the embodiment as shown in Figure 1 where the compacting occurs at one point only during the heating step. In this embodiment the pressure between the articulated pressure plates of the compacting device may be graduated so that the pressure is increasingly greater as the material advances therethrough.

While the embodiment of the present invention as herein disclosed, constitutes a preferred form, it is to be understood that other forms might be adopted, all coming within the scope of the claims which follow.

What is claimed is as follows:

1. In a method of making composite metallic elements, the steps of providing a steel supporting element, uniformly distributing non-compacted alloyable metal powders on the surface of said element, said powders being held in place by gravity, heating the element with the metal powder thereon under suitable conditions for causing the metal powders to alloy together into a porous metal layer and simultaneously alloy bond in situ to the surface of the element and concomitantly uniformly compacting the metal powder during said heating step for controlling the porosity of the porous metal layer.

2. The steps in the continuous method of making a composite metal article having a porous metal lining bonded to a reinforcing metal strip comprising, providing relatively strong non-porous metal strip material, continuously applying a substantially loose non-compacted layer of metal powder upon a substantially flat surface of said solid metal strip, and then heating the loose metal powder in situ upon said strip to a temperature and for a time sufficient to cause the metal particles to sinter together and form a porous metal lining and to cause the lining to molecularly bond to said strip and simultaneously compacting the metal powder during said sintering operation.

3. In a method of making composite metal elements, the steps of providing a steel supporting element, distributing non-compacted metal powders on the surface thereof, heating the element with the metal powder thereon to a sintering temperature and under non-oxidizing conditions and simultaneously rolling the metal powder layer, whereby the thickness of the metal powder layer only is substantially reduced for causing the metal powder to sinter together into a strong porous layer and simultaneously bond to the surface of the steel.

4. The steps in the continuous method of making composite metal strip comprising, continuously applying a loose non-compacted layer of metal powder upon a substantially flat surface of non-porous metal strip, heating the loose metal powder in situ upon the strip under suitable conditions and to a temperature and for a time sufficient to cause the metal particles to sinter together and form a porous metal lining and to cause the lining to molecularly bond to the strip and simultaneously rolling the metal powder layer during a portion of the sintering operation for reducing the porosity thereof.

5. In the method of making composite metal elements, the steps of providing a non-porous metal supporting element, distributing loose and non-compacted metal powder on the surface thereof, heating the element with the metal powder thereon to a temperature sufficient to cause the metal powder to sinter and to bond to the surface of the supporting element, said sintering being carried out under non-oxidizing conditions and simultaneously rolling the metal powder layer, whereby the porosity of the metal powder layer is reduced.

6. In the method of making composite metal elements, the steps of providing a non-porous metal supporting element, distributing loose and non-compacted metal powder on the surface thereof, heating the element with the metal powder thereon to a temperature sufficient to cause the metal powder to sinter and to bond to the surface of the supporting element, said sintering being carried out under non-oxidizing conditions and simultaneously rolling the metal powder layer during the heating period whereby the thickness of the metal powder layer is substantially reduced.

7. In the method of making composite metal elements, the steps of providing a non-porous metal supporting element, distributing loose and non-compacted metal powder on the surface thereof, heating the element with the metal powder thereon to a temperature sufficient to cause the metal powder to sinter and to bond to the surface of the supporting element, said sintering being carried out under non-oxidizing conditions, and simultaneously rolling the metal powder layer, during a portion only of the sintering period for reducing the thickness of the metal powder layer.

8. The steps in a continuous method for making composite metal strips comprising, continuously applying a loose non-compacted layer of metal powder upon a substantially flat surface of non-porous metal strip material, heating the loose metal powder in situ upon the strip under suitable conditions and to a temperature and for a time sufficient to cause the metal powder to sinter together and form a porous metal lining and to cause the lining to molecularly bond to the strip, and compressing said lining during a portion only of the sintering operation for reducing the porosity thereof.

9. In a method of making a composite metallic element including a porous metal layer thereon, the steps of providing a steel supporting element, uniformly distributing alloyable non-compacted metal powders on the surface thereof, said powders being held in place by gravity, then heating the element with the metal powders thereon under non-oxidizing conditions, and simultaneously uniformly compressing the metal powders whereby the metal powders are alloyed together into a porous layer which is bonded to the surface of the steel by an alloy bond.

10. In a method of making a composite metallic element including a porous metal layer thereon, the steps of providing a steel supporting element, uniformly distributing non-compacted alloyable metal powders thereon, said powders being held in place by gravity compressing uniformly the metal powders on the surface of said element, heating the element and the metal powders under non-oxidizing conditions for integrating the metal powders into a porous homogeneous alloy and for causing the metal powders to alloy bond to the element, said heating and compressing being carried out simultaneously.

11. In a method of making composite metallic elements, the steps of providing a steel supporting element, uniformly distributing non-compacted alloyable metal powders on the surface thereof, said powders being held in place by gravity and then heating under non-oxidizing conditions and uniformly compacting the metal powders upon said element for causing the metal powders to alloy together into a porous metal layer and to alloy bond the said element, said compacting taking place during at least a portion of the sintering period.

ROLAND P. KOEHRING.